(12) United States Patent
Antonetti et al.

(10) Patent No.: US 10,896,300 B2
(45) Date of Patent: Jan. 19, 2021

(54) WIRELESS COMMUNICATION DEVICE AND METHOD

(71) Applicant: STMicroelectronics Austria GmbH, Graz (AT)

(72) Inventors: Francesco Antonetti, Graz (AT); Christoph Chlestil, Gratwein Strassengel (AT)

(73) Assignee: STMICROELECTRONICS AUSTRIA GMBH, Graz (AT)

( * ) Notice: Subject to any disclaimer, the term of this patent is extended or adjusted under 35 U.S.C. 154(b) by 0 days.

(21) Appl. No.: 16/415,352

(22) Filed: May 17, 2019

(65) Prior Publication Data

US 2019/0370508 A1 Dec. 5, 2019

(30) Foreign Application Priority Data

May 31, 2018 (EP) .................................. 18175295

(51) Int. Cl.
*G06K 7/10* (2006.01)
*H04B 5/00* (2006.01)
*H04M 1/21* (2006.01)

(52) U.S. Cl.
CPC ....... *G06K 7/10297* (2013.01); *H04B 5/0068* (2013.01); *H04M 1/21* (2013.01); *H04M 2250/04* (2013.01)

(58) Field of Classification Search
CPC ........... G06K 7/10297; G06K 7/10366; G06K 7/10405; G06K 7/10; H04B 5/0062; H04B 5/0056; H04B 5/0093; H04B 5/0081; H04B 5/0087; H04B 5/0068; H04B 1/082; H04B 1/3822
See application file for complete search history.

(56) References Cited

U.S. PATENT DOCUMENTS

| 5,221,831 | A | * | 6/1993 | Geiszler | B65G 47/50 235/440 |
| 5,822,714 | A | * | 10/1998 | Cato | G06K 7/0008 702/108 |
| 5,874,724 | A | * | 2/1999 | Cato | G06K 7/10079 235/492 |
| 6,703,935 | B1 | * | 3/2004 | Chung | H04L 63/12 340/572.7 |

(Continued)

FOREIGN PATENT DOCUMENTS

WO 2011035191 A2 3/2011
WO 2017139594 A2 8/2017

*Primary Examiner* — Daniel I Walsh
(74) *Attorney, Agent, or Firm* — Slater Matsil, LLP

(57) ABSTRACT

A Near Field Communication (NFC) reader can wirelessly cooperate with a rectangular prism-shaped transponder having an NFC transponder antenna. The NFC reader includes an NFC controller, a matching network coupled to the NFC controller, and a receptacle capable of at least partially holding the transponder. The receptacle has a bottom wall, a lateral wall and a shape designed such that the transponder cannot be placed in the receptacle in a direction where the NFC transponder antenna is parallel to the bottom wall. The receptacle includes first and second NFC reader antennas located in two non-parallel parts of the lateral wall and a connection coupling the first and second reader antennas to the matching network.

23 Claims, 3 Drawing Sheets

(56) References Cited

U.S. PATENT DOCUMENTS

| | | | | |
|---|---|---|---|---|
| 8,310,200 B2* | 11/2012 | Matouka | | H02J 7/025 |
| | | | | 320/108 |
| 8,541,974 B2* | 9/2013 | Farahani | | H02J 50/12 |
| | | | | 320/108 |
| RE45,030 E * | 7/2014 | Stevenson | | A61B 90/98 |
| | | | | 340/539.12 |
| 9,698,632 B2* | 7/2017 | Davison | | H02J 50/40 |
| 10,044,205 B1* | 8/2018 | Voelz | | H02J 7/025 |
| 10,115,075 B1* | 10/2018 | Kantor | | G06K 7/10356 |
| 10,268,945 B1* | 4/2019 | Keller | | G06K 19/02 |
| 10,402,600 B1* | 9/2019 | Martin | | G06K 17/0029 |
| 10,651,897 B2* | 5/2020 | Lee | | H04B 5/0081 |
| 2004/0008123 A1* | 1/2004 | Carrender | | G06K 19/07749 |
| | | | | 340/8.1 |
| 2004/0100834 A1* | 5/2004 | Waters | | G06K 19/0723 |
| | | | | 365/200 |
| 2004/0102869 A1* | 5/2004 | Andersen | | G06K 19/07749 |
| | | | | 700/215 |
| 2004/0124838 A1* | 7/2004 | Duerk | | G01R 33/3692 |
| | | | | 324/304 |
| 2004/0140360 A1* | 7/2004 | Deguchi | | G06K 7/10346 |
| | | | | 235/451 |
| 2005/0122058 A1* | 6/2005 | Baarman | | H02J 50/12 |
| | | | | 315/244 |
| 2005/0184154 A1* | 8/2005 | Tanaka | | G06K 7/10336 |
| | | | | 235/385 |
| 2005/0242959 A1* | 11/2005 | Watanabe | | H01Q 7/00 |
| | | | | 340/572.7 |
| 2006/0293968 A1* | 12/2006 | Brice | | G06Q 30/06 |
| | | | | 705/14.63 |
| 2007/0008068 A1* | 1/2007 | Brice | | B62B 3/1424 |
| | | | | 340/5.91 |
| 2007/0222604 A1* | 9/2007 | Phipps | | G06K 7/10178 |
| | | | | 340/572.7 |
| 2008/0001760 A1* | 1/2008 | Oh | | H01Q 1/2216 |
| | | | | 340/572.7 |
| 2008/0054901 A1* | 3/2008 | Eberler | | G01R 33/28 |
| | | | | 324/318 |
| 2008/0143611 A1* | 6/2008 | Wang | | H01Q 1/273 |
| | | | | 343/702 |
| 2009/0283595 A1* | 11/2009 | White | | A61B 34/20 |
| | | | | 235/385 |
| 2010/0052881 A1* | 3/2010 | Lee | | B60R 25/04 |
| | | | | 340/425.5 |
| 2010/0279606 A1* | 11/2010 | Hillan | | H04B 5/00 |
| | | | | 455/41.1 |
| 2011/0062916 A1* | 3/2011 | Farahani | | H01Q 3/12 |
| | | | | 320/108 |
| 2011/0088558 A1* | 4/2011 | Farrell | | A23G 9/045 |
| | | | | 99/275 |
| 2013/0284029 A1* | 10/2013 | Reed | | G06Q 30/0241 |
| | | | | 99/280 |
| 2014/0184155 A1* | 7/2014 | Cha | | H02J 50/12 |
| | | | | 320/109 |
| 2014/0253404 A1* | 9/2014 | Ikemoto | | G06K 19/07779 |
| | | | | 343/788 |
| 2015/0084584 A1* | 3/2015 | Monks | | H02J 7/0013 |
| | | | | 320/108 |
| 2015/0295623 A1* | 10/2015 | Li | | H04B 5/0081 |
| | | | | 455/41.1 |
| 2016/0166096 A1* | 6/2016 | DiMaria-Ghalili | | G01N 9/02 |
| | | | | 702/19 |
| 2016/0241306 A1* | 8/2016 | Moon | | H01Q 7/00 |
| 2016/0322853 A1* | 11/2016 | Porat | | H02J 7/025 |
| 2017/0085297 A1* | 3/2017 | Gao | | H02J 50/80 |
| 2017/0272127 A1* | 9/2017 | Jang | | H04B 5/0081 |
| 2017/0331317 A1* | 11/2017 | Wheeland | | H04B 5/0087 |
| 2018/0060618 A1* | 3/2018 | Ferrer Alos | | G06K 7/10356 |
| 2018/0138748 A1* | 5/2018 | Adolf | | H02J 50/40 |
| 2019/0074915 A1* | 3/2019 | Greene | | G01S 13/74 |
| 2019/0104571 A1* | 4/2019 | Clark | | A47J 36/027 |
| 2019/0305824 A1* | 10/2019 | Antonetti | | H04B 5/0087 |
| 2019/0347454 A1* | 11/2019 | Mongrenier | | G05B 19/042 |
| 2019/0370508 A1* | 12/2019 | Antonetti | | H04B 5/0087 |
| 2020/0039411 A1* | 2/2020 | Paschal | | B60N 3/104 |
| 2020/0134948 A1* | 4/2020 | Sengstaken, Jr. | | G06K 7/10366 |

* cited by examiner

WIRELESS COMMUNICATION DEVICE AND METHOD

CROSS-REFERENCE TO RELATED APPLICATIONS

This application claims priority to European Patent Application No. 18175295.7, filed on May 31, 2018, which application is hereby incorporated herein by reference.

TECHNICAL FIELD

Embodiments of the invention relate to wireless communication between elements.

BACKGROUND

Further to its conventional telephone function, a mobile phone may be used for exchanging information with a contactless device by using a contactless communication protocol. In some applications the mobile phone may be emulated in a card mode. In such a case it operates as a card or a transponder (passive or active) and may be read by a contactless reader.

Near Field Communication or NFC is a short range high frequency wireless communication technology which enables such exchange of data between two contactless devices over a short distance, for example 10 centimeters.

NFC is an open platform technology standardized in ISO/IEC 18092 and ISO/IEC 21481 but incorporates a variety of pre-existing standards including ISO/IEC 14443 protocol type A and type B.

NFC readers have the capability to support, in particular, a reader/writer mode which can be used to read and write NFC transponders or tags.

SUMMARY

Embodiments of the invention relate to wireless communication between elements, for example, between a reader and a transponder. Particular embodiments relate to communication between a Near Field Communication (NFC) contactless tag reader and a tag, for example, a wireless apparatus emulated in card mode, such as a mobile phone or a phablet emulated in card mode. These communications typically use a high frequency communication operating at 13.56 MHz.

Embodiments of the invention relate to the location of the NFC antenna system of the reader. In some embodiments, a receptacle designed to usually receive an object different from a transponder is capable to occasionally receive a transponder, for example a mobile phone. This is, for example, the case for a cup holder located within a vehicle, which is designed for usually receiving one or several cups but in which a mobile phone may be placed.

Embodiments can provide an efficient NFC reader antenna system that permits good NFC communication between the reader and the transponder, for example, a standard NFC card or a mobile phone or a phablet, when the transponder is placed in a receptacle whatever the position of the transponder. For example, the receptacle, for example a cup holder, can be designed in a way that the transponder cannot be placed horizontally into the receptacle leading to the situation where the complete transponder does touch the surface of the receptacle.

According to an aspect, a Near Field Communication-NFC-reader is proposed, which is intended to wireless cooperate with a transponder having an NFC transponder antenna.

A wireless cooperation includes exchanges of data between the reader and the transponder and/or a contactless charging of the transponder.

The transponder maybe for example a mobile phone or a phablet emulated in card mode.

The reader comprises a NFC controller, a matching network coupled to the NFC controller and a receptacle, or holder, capable to lodge at least partially the transponder.

The receptacle has a bottom wall, a lateral wall and a shape designed in a way that the transponder cannot be placed in the receptacle such that the NFC transponder antenna is parallel to the bottom wall.

Thus for example the transponder cannot be placed horizontally into the receptacle leading to the situation where the complete transponder does touch the surface of the bottom wall of the receptacle.

This is, for example but in a non-limiting way, the case where the receptacle is a cup holder capable to hold one or two cups, such as those located in a vehicle, for example a car.

According to this aspect the receptacle includes at least two NFC reader antennas respectively contained in at least two non-parallel parts of the lateral wall of the receptacle, and the reader further includes connecting means configured to connect the reader antennas to the matching network.

An NFC antenna is an antenna configured to allow information transfers according to Near Field Communication.

Thus with such NFC reader antennas configuration, a good contactless communication between the reader and the transponder, for example a standard NFC card or a mobile phone emulated in card mode, is possible whatever for example the vertical orientation of the transponder into the receptacle.

Further there is no need of several readers.

In particular when the transponder is a mobile phone, the transponder may comprise a cover, for example a back cover, parallel to the NFC transponder antenna, and the shape of the receptacle is designed in a way that the transponder cannot be placed in the receptacle such that the cover is in contact with the bottom wall of the receptacle.

The lateral wall of the receptacle maybe a closed continuous lateral wall.

According to an embodiment the lateral wall comprises two long sides and two short sides and a first reader antenna extends within both long sides while a second reader antenna extends within both short sides.

This is for example the case when the receptacle is a cup holder designed for receiving two cups.

According to an embodiment the connecting means comprise wires extending in the bottom wall.

According to an embodiment the NFC controller is configured to drive differentially the NFC reader antennas.

As a variant the NFC controller maybe configured to drive each NFC reader antenna in single ended mode and to drive sequentially the NFC reader antennas.

According to an embodiment the NFC controller and the matching network are located outside of the receptacle, for example on a board electrically coupled to the reader antennas.

When the receptacle is a cup holder, it may be intended to be located within a vehicle.

As mentioned above although the transponder maybe an ordinary contactless card, it maybe also a mobile device such as a mobile phone or a phablet.

According to another aspect a receptacle is proposed belonging to a NFC reader as defined above.

According to another aspect a vehicle is proposed, including a NFC reader as defined above.

BRIEF DESCRIPTION OF THE DRAWINGS

Other advantages and features of the invention will appear in the detailed description below and in the appended drawings which are not limitative, in which.

DETAILED DESCRIPTION OF ILLUSTRATIVE EMBODIMENTS

Figure 1:
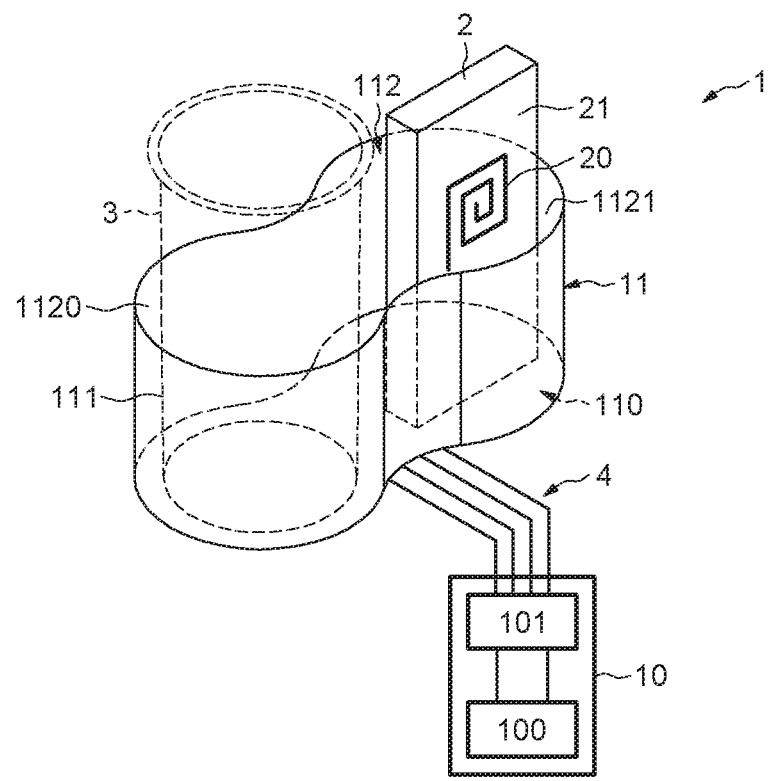
FIGS. 1-5 illustrate particular embodiments of the invention.

In FIG. 1, reference numeral 1 designates a NFC reader. The reader 1 in this example comprises an electronic board 10 supporting a NFC controller 100 and a matching network 101 coupled to the NFC controller.

The NCF reader further comprises a receptacle or holder 11 capable to lodge at least partially a transponder 2. In this example, the transponder may be a card or a mobile phone or a phablet emulated in card mode. The transponder 2 in this example is in the shape of a rectangular prism or cuboid.

The NFC reader is intended to wirelessly cooperate with the transponder, which has an NFC transponder antenna 20 located, for example, in the backside of the transponder.

The wireless cooperation between the NFC reader and the NFC transponder includes information exchanges according to a specific protocol, for example, protocol A of standard ISO/IEC 14443. In this context, a specific protocol refers to any version of the protocol that has been finalized by the effective filing date of this patent.

As it can be shown in FIG. 1, the receptacle 11 has a bottom wall 110, a lateral wall 111, and a shape designed in a way that the transponder 2 cannot be placed in the receptacle such that the NFC transponder antenna 20 is parallel to the bottom wall.

In other words, in the present example, the transponder, for example the mobile phone, which comprises a cover, here a back cover 21, parallel to the NFC transponder antenna 20, cannot be placed horizontally and totally in contact with the bottom wall 110 of the receptacle.

In other words, the transponder cannot be placed in the receptacle such that the cover 21 is in contact with the bottom wall 110 of the receptacle.

In this particular example, the receptacle is a cup holder designed for receiving two cups 3, one of which is illustrated in FIG. 1. More precisely, the receptacle comprises an opening 112 having a first opening 1120 and a second opening 1121 for respectively receiving the two cups 3.

As illustrated in FIG. 1, the mobile phone with transponder 2 may be placed in one of the two openings, here in the opening 1121.

Figure 2:
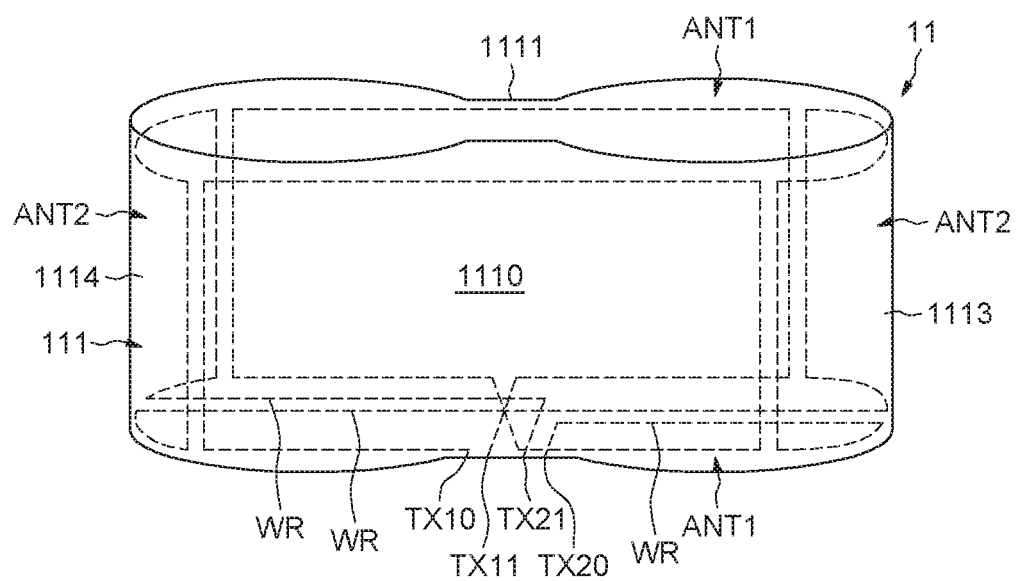

In the present example, the lateral wall 111 of the receptacle is a closed continuous lateral wall comprising, as illustrated more in details in FIG. 2, two long sides 1110 and 1111 and two short sides 1113 and 1114.

The receptacle includes here two NFC reader antennas ANT1, ANT2 respectively contained in two non-parallel parts of the lateral wall.

More precisely, a first antenna ANT1 extends within both long sides 1110 and 1111 while the second antenna ANT2 extends within both short sides 1113 and 1114.

More precisely, in this example, the antenna ANT1 comprises a coil coupled to two terminals TX10 and TX11, the coil having a first turn in long side 1110 and another turn in long side 1111.

The antenna ANT2 also comprises a coil extending within both short sides 1113 and 1114 and coupled to two terminals TX20 and TX21.

As illustrated in FIG. 1, both antennas ANT1 and ANT2 are connected to the matching circuit 101 of the board 10 by connection 4, which is implemented by wires in this example.

In this example, connection 4 also comprises wires WR extending within the bottom wall of the receptacle to connect coils of the antennas to the corresponding terminals. Those connecting wires WR are close together in order to not form a loop able to span an RF field.

As a variant, the connection 4 may also comprise a dedicated connector with pins for connecting the terminals of the receptacle to the matching circuit located on the electronic board 10.

The NFC controller 100 may be configured to drive each NFC reader antenna in a single ended mode and to drive sequentially the NFC reader antennas ANT1, ANT2 to select the appropriate antenna.

As a variant, the NFC controller may be configured to drive differentially the NFC reader antennas ANT1, ANT2.

In this respect, the NFC controller 100 comprises a differential output driver and the two RF outputs can be also driven in a single ended mode. For example, it is possible to use the NFC controller sold by the company STMicroelectronics under the reference ST25R3911B or ST25R391x.

Such an NFC controller can drive two antennas either differentially or in a single ended mode. Further, with a specific register setting and a dedicated firmware, the two drivers can also work sequentially.

Figure 3:
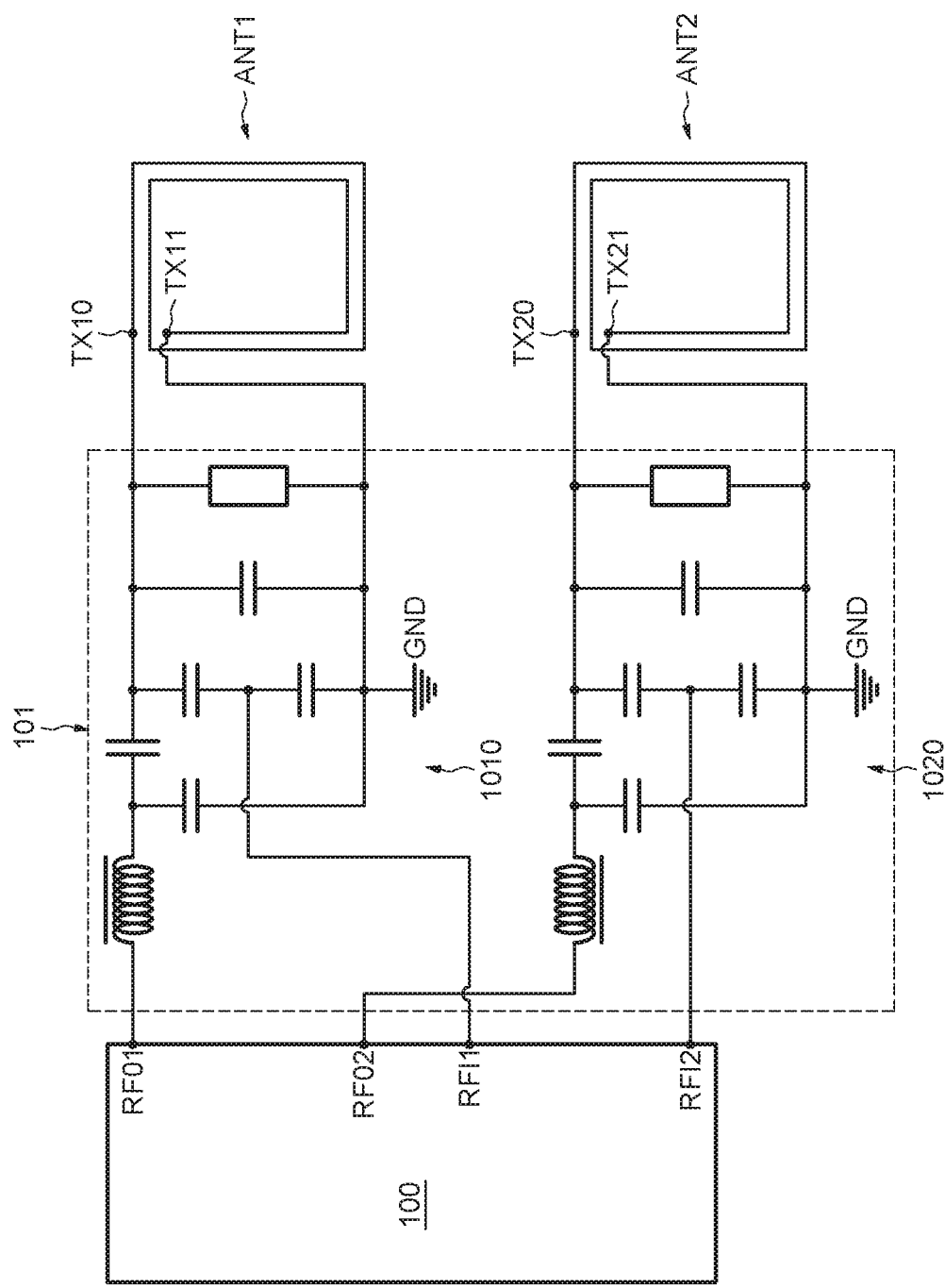

FIG. 3 illustrates diagrammatically an embodiment in which the two antennas ANT1 and ANT2 are driven in a single ended mode.

More precisely, one output RFO1 of the driver is connected to terminal TX10 of antenna ANT1 through a first matching circuit 1010 while a first input RFI1 of the NFC controller is connected to the matching circuit 1010. The other terminal TX11 of antenna ANT1 is connected to the ground GND.

By analogy, the second output RFO2 of the driver is connected to terminal TX20 of antenna ANT2 through a second matching circuit 1020 while the other input RFI2 of the NFC controller is connected to the matching circuit 1020.

The other terminal TX21 of antenna ANT2 is also connected to ground GND.

The two matching circuits 1010 and 1020 together for the matching network 101. Nevertheless, each matching circuit 1010 or 1020 is adapted to its corresponding antenna ANT1. As it is well known by one skilled in the art, a matching circuit is a circuit that adjusts the antenna impedance to a desired value for the driver output.

The matching circuit also generally comprises a filter, called EMI filter, which is intended to filter the electromagnetic interferences. This filter is conventionally an inductive capacity filter.

Figure 4:
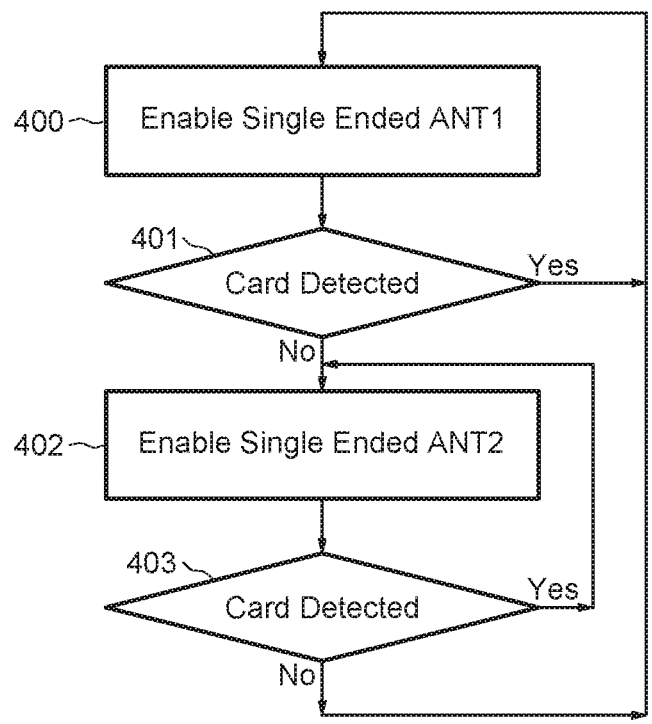

An example of operation of the NFC reader is illustrated diagrammatically in FIG. 4. In this example, the two antennas are driven sequentially in the single ended mode.

In a step 400, the first antenna ANT1 is enabled and the NFC controller determines in step 401 if the card or transponder 2 is detected by using this single ended antenna ANT1.

If the card or transponder is detected, this antenna remains enabled and the other antenna ANT2 is not enabled.

If in step 401, the card is not detected by antenna ANT1, the driver enables the second antenna ANT2 (step 402) to determine in step 403 whether the card is actually detected.

If the card is detected here, the second antenna ANT2 remains enabled and the first antenna ANT1 is not enabled. If the card is not detected in step 403, step 400 is again executed.

While in the example described in relation with FIG. 3, the antennas ANT1 and ANT2 are driven in a single ended mode, it would be also possible for the two output drivers of the NFC controller to drive both antennas differentially without changing the hardware architecture illustrated in this FIG. 3.

As a matter of fact, in a single antenna driven in a differential mode, the sinusoidal signal is going through the coil and it has a zero potential in the center of the coil. This point is called virtual ground. A virtual ground is a point (which is the geometrical center in a symmetrical coil), that is maintained at a steady reference potential, without being connected directly to the reference GND potential. That said, in some embodiments the virtual ground could be connected to the reference GND potential.

Here both antennas ANT1 and ANT2 driven differentially may be seen as a single antenna having the virtual ground formed by terminals TX11 and TX21.

Connecting both terminal TX11 and TX21 to GND permits to obtain a differential configuration but also to split the differential configuration into two single ended configurations without hardware modification.

In other words the hardware configuration illustrated in FIG. 3 is identical whatever the way how the antennas are driven (differentially or in single ended mode). The only difference resides in the way how the output drivers operate. For example, a controller could be programmed differently in the different embodiments.

Using the single ended configuration permits to reduce the output power by the half with respect to the output power obtained in the differential configuration.

It is possible to detect the portional volume of the cup holder, where the card has been placed enabling one single ended antenna as explained above.

In the differential mode, the two output drivers are always active. In this case, the benefit is in using the antenna layout which allows reading of the card in the full volume of the cup holder without communication holes.

Figure 5:
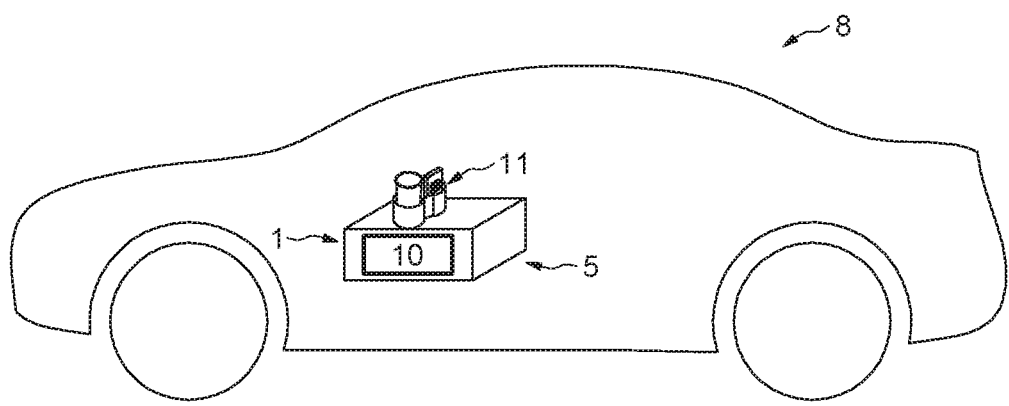

A particular application of the invention is in the automotive field. For example, FIG. 5 illustrates a vehicle 8, for example a car, that comprises a front console 5 designed for receiving the cup holder 11 of the reader 1.

In such a case, the electronic board 10, which supports the NFC controller 100 and the matching circuit 101, may be placed within the front console, for example, below the receptacle 11, and can be connected to the receptacle by soldered wires or specific connectors.

However, other applications are possible, where it is necessary to read a card in any position with respect to the receptacle receiving the card.

What is claimed is:

1. A Near Field Communication (NFC) reader comprising:
    a near field communication (NFC) controller;
    a receptacle comprising a bottom wall, a first lateral wall, a second lateral wall, a third lateral wall, and a fourth lateral wall, an inner portion of the first lateral wall facing substantially in parallel with an inner portion of the second lateral wall, an inner portion of the third lateral wall facing substantially in parallel with an inner portion of the fourth lateral wall, the receptacle capable of at least partially holding a transponder having a rectangular prism shape, the receptacle having a shape designed such that the transponder cannot be placed in the receptacle in a direction where an NFC antenna of the transponder is parallel to the bottom wall of the receptacle;
    a first NFC reader antenna having a first coil coupled to the NFC controller, the first coil arranged to have a first terminal in the first lateral wall and a second terminal in the second lateral wall, the first coil arranged substantially along an outer edge in the first lateral wall, extending from the first lateral wall to the second lateral wall through the bottom wall, and arranged substantially along an outer edge in the second lateral wall; and
    a second NFC reader antenna having a second coil coupled to the NFC controller, the second coil arranged to have a first terminal in the third lateral wall and a second terminal in the fourth lateral wall, the second coil arranged substantially along an outer edge in the third lateral wall, extending from the third lateral wall to the fourth lateral wall through the bottom wall, and arranged substantially along an outer edge in the fourth lateral wall.

2. The NFC reader according to claim 1, wherein the transponder comprises a cover parallel to the NFC antenna of the transponder, and the shape of the receptacle is designed in a way that the transponder cannot be placed in the receptacle such that the cover is in contact with the bottom wall of the receptacle.

3. The NFC reader according to claim 1, wherein the first lateral wall, the second lateral wall, the third lateral wall, and the fourth lateral wall of the receptacle provide a closed continuous lateral wall.

4. The NFC reader according to claim 3, wherein each of the first lateral wall and the second lateral wall is a long side, each of the third lateral wall and the fourth lateral wall is a short side, and wherein the first NFC reader antenna extends within both long sides while the second NFC reader antenna extends within both short sides.

5. The NFC reader according to claim 1, wherein the NFC reader further comprises a matching network coupled to the NFC controller, wherein the first NFC reader antenna and the second NFC reader antenna are coupled to the matching network using connection having wires extending in the bottom wall.

6. The NFC reader according to claim 1, wherein the NFC controller is configured to differentially drive the NFC reader antennas.

7. The NFC reader according to claim 1, wherein the NFC controller is configured to drive each NFC reader antenna in single ended mode.

8. The NFC reader according to claim 1, wherein the NFC reader further comprises a matching network coupled to the NFC controller, wherein the NFC controller and the matching network are located outside of the receptacle.

9. The NFC reader according to claim 1, wherein the receptacle is a cup holder.

10. The NFC reader according to claim 9, wherein the cup holder is designed for receiving two cups.

11. The NFC reader according to claim 9, wherein the cup holder is designed to be located within a vehicle.

12. The NFC reader according to claim 1, wherein the transponder is a mobile communication device.

13. The NFC reader according to claim 12, wherein the mobile communication device is a mobile phone or a phablet.

14. A cup holder comprising:
a near field communication (NFC) controller;
a matching network coupled to the NFC controller;
a receptacle body capable of holding a cylindrical shaped object and a rectangular prism-shaped object, the receptacle body having a bottom wall, a first lateral wall, a second lateral wall, a third lateral wall, a fourth lateral wall, and a shape designed such that the cylindrical shaped object cannot be placed in the receptacle body in a direction where a largest surface of the cylindrical shaped object is parallel to the bottom wall, an inner portion of the first lateral wall facing substantially in parallel with an inner portion of the second lateral wall, an inner portion of the third lateral wall facing substantially in parallel with an inner portion of the fourth lateral wall;
a first NFC reader antenna having a first coil coupled to the NFC controller, the first coil arranged to have a first terminal in the first lateral wall and a second terminal in the second lateral wall, the first coil arranged substantially along an outer edge in the first lateral wall, extending from the first lateral wall to the second lateral wall through the bottom wall, and arranged substantially along an outer edge in the second lateral wall;
a second NFC reader antenna having a second coil coupled to the NFC controller, the second coil arranged to have a first terminal in the third lateral wall and a second terminal in the fourth lateral wall, the second coil arranged substantially along an outer edge in the third lateral wall, extending from the third lateral wall to the fourth lateral wall through the bottom wall, and arranged substantially along an outer edge in the fourth lateral wall; and
a connection coupling the first and second NFC reader antennas to the matching network.

15. The cup holder according to claim 14, wherein the shape of the receptacle body is designed in a way that the cylindrical shaped object cannot be placed in the receptacle body such the largest surface of the cylindrical shaped object is in contact with the bottom wall.

16. The cup holder according to claim 14, wherein the first lateral wall, the second lateral wall, the third lateral wall, and the fourth lateral wall of the receptacle body provides a closed continuous lateral wall.

17. The cup holder according to claim 16, wherein each of the first lateral wall and the second lateral wall is a long side and each of the third lateral wall and the fourth lateral wall is a short side and wherein the first NFC reader antenna extends within both long sides while the second NFC reader antenna extends within both short sides.

18. The cup holder according to claim 14, wherein the connection comprises wires extending in the bottom wall.

19. The cup holder according to claim 14, wherein the NFC controller is configured to differentially drive the first and second NFC reader antennas in a first mode and to drive each of the first and second NFC reader antennas in single ended mode.

20. The cup holder according to claim 14, wherein the NFC controller and the matching network are located outside of the receptacle body.

21. A method comprising:
providing a near field communication (NFC) controller;
providing a receptacle comprising a bottom wall, a first lateral wall, a second lateral wall, a third lateral wall, and a fourth lateral wall, an inner portion of the first lateral wall facing substantially in parallel with an inner portion of the second lateral wall, an inner portion of the third lateral wall facing substantially in parallel with an inner portion of the fourth lateral wall;
providing a first NFC reader antenna having a first coil coupled to the NFC controller, the first coil arranged to have a first terminal in the first lateral wall and a second terminal in the second lateral wall, the first coil arranged substantially along an outer edge in the first lateral wall, extending from the first lateral wall to the second lateral wall through the bottom wall, and arranged substantially along an outer edge in the second lateral wall; and
providing a second NFC reader antenna having a second coil coupled to the NFC controller, the second coil arranged to have a first terminal in the third lateral wall and a second terminal in the fourth lateral wall, the second coil arranged substantially along an outer edge in the third lateral wall, extending from the third lateral wall to the fourth lateral wall through the bottom wall, and arranged substantially along an outer edge in the fourth lateral wall;
receiving a rectangular prism-shaped transponder having an NFC transponder antenna parallel to a main surface of the rectangular prism-shaped transponder, a body of the receptacle having a shape designed such that the rectangular prism-shaped transponder cannot be placed in the receptacle in a direction where the main surface of the rectangular prism-shaped transponder is parallel to the bottom wall;
operating the first NFC antenna in a single ended mode to determine whether the rectangular prism-shaped transponder has been detected;
if the rectangular prism-shaped transponder is detected by the first NFC antenna, continuing to operate the first NFC antenna while the second NFC antenna is not enabled;
if the rectangular prism-shaped transponder is not detected by the first NFC antenna, operating the second NFC antenna in the single ended mode to determine whether the rectangular prism-shaped transponder has been detected;
if the rectangular prism-shaped transponder is detected by the second NFC antenna, continuing to operate the second NFC antenna while the first NFC antenna is not enabled; and
if the rectangular prism-shaped transponder is not detected by the second NFC antenna, repeating the step of operating the first NFC antenna in the single ended mode to determine whether the rectangular prism-shaped transponder has been detected.

22. The method according to claim 21, wherein each of the first lateral wall and the second lateral wall is a long side and each of the third lateral wall and the fourth lateral wall is a short side, wherein the first NFC reader antenna extends within both long sides and the second NFC reader antenna extends within both short sides, and connection wires extend in the bottom wall.

23. The method according to claim 21, wherein a body of the receptacle is a cup holder in the rectangular prism-shaped transponder is a mobile communication device.

* * * * *